July 16, 1940.  A. KURTZ  2,208,335
FOOD GRATER
Filed March 29, 1939  2 Sheets-Sheet 1
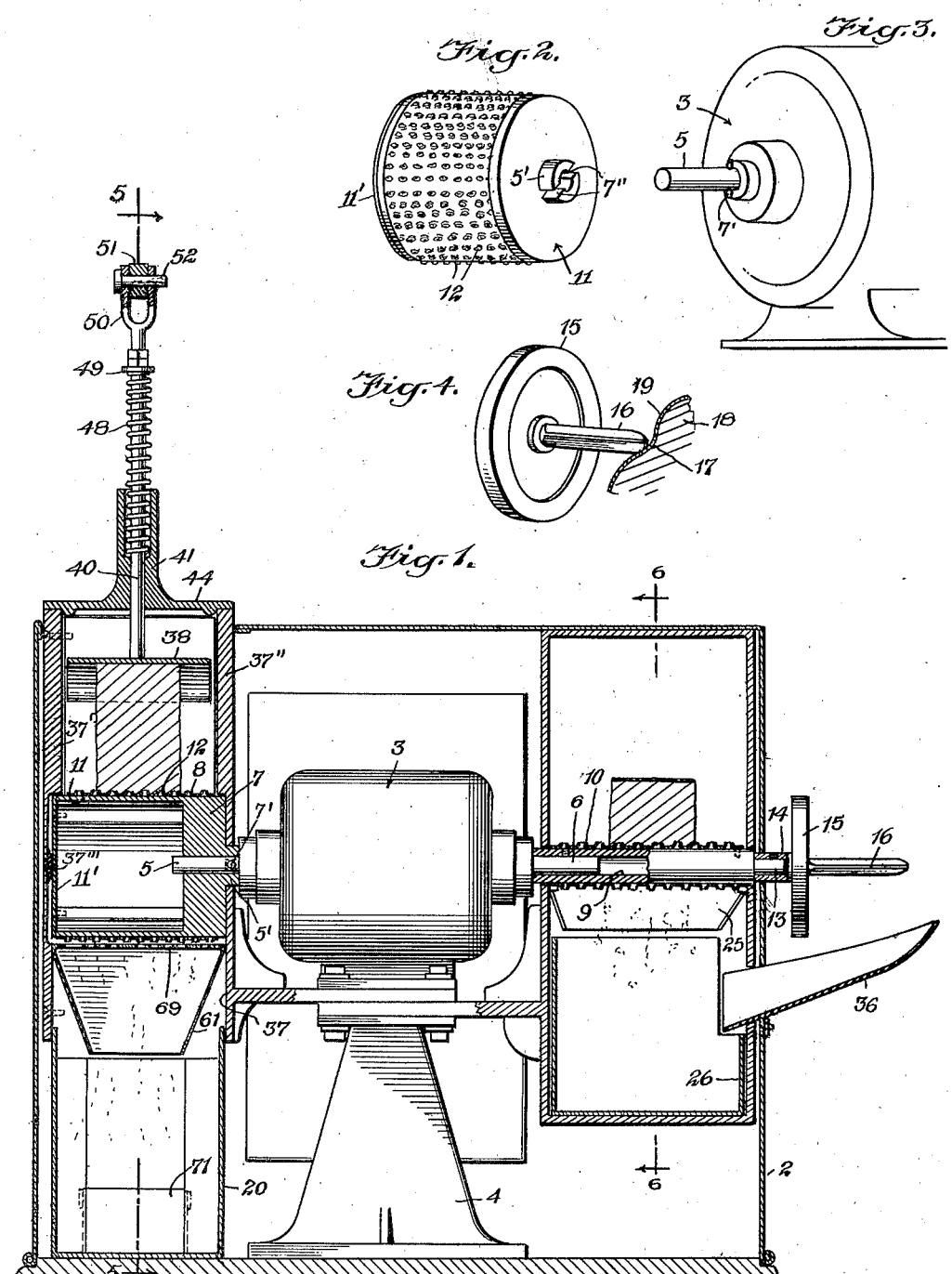
WITNESSES
INVENTOR
Alfred Kurtz
BY
ATTORNEYS July 16, 1940.     A. KURTZ     2,208,335
FOOD GRATER
Filed March 29, 1939     2 Sheets-Sheet 2
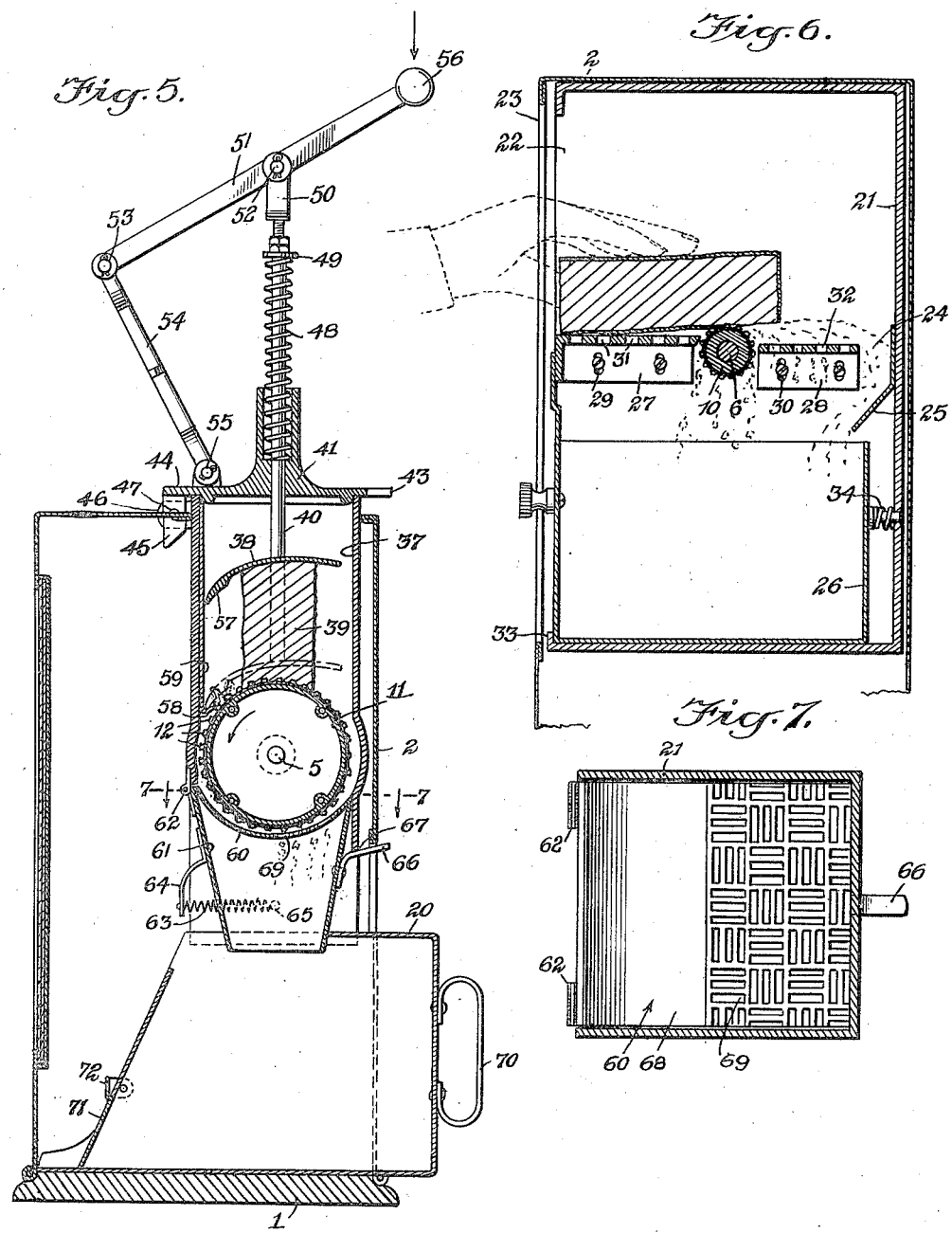

Patented July 16, 1940

2,208,335

UNITED STATES PATENT OFFICE 2,208,335

FOOD GRATER

Alfred Kurtz, Brooklyn, N. Y.

Application March 29, 1939, Serial No. 264,768

4 Claims. (Cl. 146—177)

This invention relates to food graters and has for an object to provide an improved construction wherein all of the grating members and associated parts are arranged in a housing or casing from which the grated material will not be scattered over the counter or floor.

Another object of the invention is to provide a grater which will grate cheese, stale bread, nuts, vegetables, or other articles of comparatively hard food.

An additional object of the invention is to provide an improved grater provided with a pair of grating drums, one of which acts as an implement for grating the food and the other as an implement for trimming and cleaning the food preparatory to grating.

An additional and further object is to provide a grater which will not only grate cheese and other articles of food, but which presents a goring or trimming implement for removing the rind or other hard parts from cheese and other articles of food when located in depressions, grooves, or the like.

In the accompanying drawings—

Fig. 1 is a longitudinal vertical sectional view through a grater disclosing an embodiment of the invention;

Fig. 2 is a perspective view of one of the grating drums shown in Fig. 1;

Fig. 3 is a perspective view of one half of the drum shown in Fig. 1;

Fig. 4 is a perspective view of a hand wheel and goring implement embodying certain features of the invention;

Fig. 5 is a sectional view through Fig. 1 approximately on the line 5—5;

Fig. 6 is a sectional view through Fig. 1 approximately on the line 6—6;

Fig. 7 is a fragmentary sectional view through Fig. 5 approximately on the line 7—7.

Referring to the accompanying drawings by numerals, 1 indicates a base which may be wood or other suitable material, and 2 indicates a casing or housing which also may be of any suitable material, preferably metal, and secured to the base 1 in any desired manner. As shown in Fig. 1, a motor 3 is provided which is illustrated as an electric motor and which is supported by a suitable support 4 mounted on base 1 and preferably secured thereto by screws or other desired means. The motor 3 has shaft extensions 5 and 6 which are connected to the rotating part of the motor and, if desired, may be made in one piece. The shaft extension 5 is rigidly secured to the end 7 of a grating drum 8, while the shaft extension 6 is rigidly secured to a sleeve 9 carrying a cleaning grating drum 10. The drum 10 may be secured to the sleeve 9 by a set screw or other suitable means while the shaft extension 5 is secured to the hub 5' by a pin 7' fitting in the notches 7''.

Preferably the drum 8 is provided with a solid tubular body 11, which may be integral with end 7 or separate and rigidly secured thereto. The end 11' is solid throughout and connected to the body 11 in any desired way whereby none of the material being grated can enter the interior of the drum. In this connection it will be seen from Fig. 1 that the ends of body 11 are covered by part of the walls 37' and 37''. If the walls are made of thin material any suitable overlapping member may be used, but if the walls are comparatively thick, as shown in Fig. 1, the drum may at its respective ends extend into suitable cut-out portions and in this way prevent any of the cheese or other food being grated wedging in between the ends of the drum and the side walls. It will also be noted that a fibre or other stop 37''' is carried by wall 37' so as to prevent rattling of the drum against the respective walls 37' and 37''.

On top of the tubular body 11 is mounted a grating member 12 held in place by friction, a set screw, or otherwise. The sleeve 9 carrying the grating drum 10 is provided with a pin 13 which may be secured in place by friction or a set screw and on this pin the hub 14 is mounted. This hub is adapted to be secured to pin 13 by a suitable set screw and is adapted to carry a hand wheel 15 to which is permanently connected a goring or trimming member 16. The implement or member 16 is preferably a bladed structure rounded at the outer end and, as shown, there are four blades but if desired more or even less blades could be provided without departing from the spirit of the invention. When the member 16 is rotating it may be pressed against a depression 17 in a cheese 18 for removing the rind 19 therefrom. Other forms of depressions, grooves, or irregular places may have the rind removed by this implement. Whether the article of food is round or flat, the rind or hard covering may be removed by the grater as illustrated particularly in Fig. 6.

In certain foods an outer coating or covering is usually present which is more or less objectionable and must be removed. In the case of hard cheese the outer coating or rind 19, as shown in Fig. 4, is objectionable to the taste and, therefore, is always removed before the cheese is grated. Grated cheese is used on macaroni and other food for seasoning and if the rind were grated along with the body of the cheese the flavor would be objectionable. By providing the implement 16 and the grating drum 10, this rind may be readily removed and then the block of cheese placed on the grater 12, which will grate the block of cheese and discharge the grated cheese downwardly into a drawer or other receptacle 20, as shown in Fig. 5.

As illustrated particularly in Fig. 6, the grater or grating drum 10 is arranged in a housing or hopper 21 which has an opening 22 opposite a suitable opening 23 in the large housing or enclosure 2. Where the cheese or other article is rectangular in shape, as shown in Fig. 6, the same is placed on the grating drum 10 and pushed along until the rind has been removed. The rind as it is removed is thrown to the right, as shown in Fig. 6, and most of the rind passes down through the passageway 24 and is deflected by a deflecting plate 25 so as to drop into a container or drawer 26. A support is provided for the cheese and this support is divided into parts 27 and 28 adjustably supported by screws 29 and 30 extending through suitable slots in the support. It will also be noted that the supports are provided with a number of openings 31 and 32. The drawer or container 26 fits in back of a short flange 33 and against a rubber bumper 34 carried at the back of the housing 21. The bumper 34 causes the drawer 26 to press against the flange 33 and, therefore, to be held against rattling when the device is in use.

By performing the grating operation for removing the rind 19 in the housing 21, the grated rind is thrown to a point where it is caught in the container 26 and later disposed of. When the rind from a depression is removed, as illustrated in Fig. 4, it drops down on a deflecting member 36, as shown in Fig. 1, and gravitates into the drawer or container 26. After the cheese or other article has been properly cleaned, as shown in Fig. 6, it is placed in the auxiliary housing or hopper 37, as shown in Figs. 1 and 5. A feeder or feeding plate 38 rests on top of the article of food 39 so as to press the same against the grating drum 11. A rod 40 is rigidly secured to the feeder 38 and is adapted to move the same upwardly and downwardly. This rod slidably extends through a cover 41 which acts as a closure for the hopper 37. It will be noted that the cover 41 is provided with an inner flange 42 snugly fitting within the hopper so as to provide a reasonably tight connection between the parts. An extension 43 acts as a handle at one point and another extension 44 carries a depending web 45 which is arranged adjacent the ear 46 rigidly secured to hopper 37. A pin 47 acts as a pintle and, consequently, the cover 41 may be swung open and closed as desired provided the feeder 38 is near the top of the hopper. A spring 48 acts on an adjustable stop 49 to give the rod 40 a tendency to raise the feeder 38 to a position near the cover 41. The upper end of rod 40 has a bifurcated portion 50 straddling a lever 51 and pivotally connected therewith by a pin 52. One end of lever 51 is pivotally connected at 53 to a link 54, which in turn is pivotally mounted at 55 on the cover 41. A handle or knob 56 is connected to the free end of lever 51 and is adapted to be grasped by the hand of the operator and pressed downwardly when it is desired to grate the cheese 39. The feeder 38 is preferably slightly arc-shaped and is formed with an arc-shaped surface 57 adapted to be moved downwardly to near the grating drum 11 when most of the cheese 39 has been grated. This will prevent small and large parts of the cheese 39 from passing around the drum to a discharge point.

As the cheese passes between surface 57 and the grating drum 10, it is grated to a large extent and where a comparatively large piece attempts to pass the hook plate or member 58 prevents such passage. This plate is provided with a body 59 welded, riveted, or otherwise rigidly secured to the hopper 37. When the cheese or other article of food is grated sufficiently fine, it will pass around with the drum 11 on to the arc-shaped end 60 of a discharge chute 61, as shown in Fig. 5. The chute 61 is preferably tapered and is hingedly mounted at 62 and held in the position shown in Fig. 5 by a retractile spring 63 acting on a bracket 64 and a fixed post 65. A handle or lever 66 is secured to the chute 61 opposite bracket 64 and is adapted to strike against the edge 67 of hopper 37 while limiting the upward swinging movement of the chute. Whenever desired the handle 66 could be depressed and the chute would swing on the hinge 62 against the action of spring 63. The top or end 60 is provided with a solid portion 68, as shown in Fig. 7, and a foraminous portion 69. The top can be divided approximately half and half, as shown in Fig. 7, or if desired a greater proportion may be used for the foraminous part without departing from the spirit of the invention. The grated material passes through the foraminous part 69 downwardly into the drawer or container 20. This drawer or container is provided with a handle 70 and a discharge door 71. The drawer may be pulled out of the device to the right, as shown in Fig. 5, and then by pressing against the extension 72 the door 71 will open whereby the cheese or other grated matter may be discharged into a bag or other desired receptacle.

In operation, the cheese is cleaned, as shown in Figs. 4 and 6, and is then placed in the hopper 37 after which the knob 56 is depressed and constant pressure maintained until the desired amount of cheese or other food has been grated. By releasing the knob 56, the spring 48 will immediately raise the feeder 38 and even though the motor 3 is rotating drum 11, the grating operation will substantially cease.

If it is desired to permanently stop any action on the part of the device, the power from motor 3 is turned off and then the grated material in the drawer 20 may all be discharged at one time or small portions from time to time as desired.

I claim:

1. A food grater including a grating drum, means for rotating said drum, and an adjustable support positioned adjacent said drum for supporting an article of food adjacent the drum, said support comprising a pair of foraminous plates positioned respectively on opposite sides of the drum, each of said plates having a depending slotted web and clamping members extending through the slots in said webs for independently clamping the respective plates at desired heights in respect to the drum.

2. A food grater including a grating drum, power means for rotating the drum, a housing enclosing said drum, a chute pivotally connected to said housing at the lower end, said chute having an arc-shaped top solid for part of its width and foraminous for part its width, said foraminous part being positioned at one side of a line drawn longitudinally through the center of said housing, said top having substantially the same arc as said drum and positioned to be near the lower part of the drum, a spring functioning to normally hold said chute in its functioning position, a finger engaging abutment for swinging the chute to an open position against the action of said spring, and manually actuated means for forcing an article of food against said drum.

3. A food grater including a rotatable grating drum, power means for rotating said drum, a housing enclosing said drum, manually actuated means extending into said housing for forcing an article of food against said drum, and a plate fixed to the wall of the housing toward which the drum rotates, the lower end of said plate being at least as wide as said drum and being bent toward the circumference of the same and immediately adjacent to said circumference and above the axis of the drum to form a trough and prevent large pieces passing to the discharge point of the device.

4. A food grater including a rotatable grating drum, means for pressing food against said drum while the drum is rotating, power means for rotating said drum, a chute for catching and guiding to a discharge point the grated food, said chute having an arc-shaped perforated upper end arranged adjacent the lower part of said drum, and spring means for holding said perforated end adjacent said drum, said spring permitting said upper end to swing slightly away from said drum when a piece of food larger than said perforation moves into said upper end whereby said article of food will be moved upwardly and over the top of said drum so as to be subjected to a second grating action.

ALFRED KURTZ.